United States Patent
Liu

(10) Patent No.: US 9,779,506 B2
(45) Date of Patent: Oct. 3, 2017

(54) METHOD FOR PROCESSING INFORMATION AND ELECTRONIC DEVICE

(71) Applicant: Lenovo (Beijing) Co., Ltd., Beijing (CN)

(72) Inventor: Yonghua Liu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 6 days.

(21) Appl. No.: 14/839,012

(22) Filed: Aug. 28, 2015

(65) Prior Publication Data

US 2016/0292871 A1    Oct. 6, 2016

(30) Foreign Application Priority Data

Mar. 30, 2015  (CN) .......................... 2015 1 0145612

(51) Int. Cl.
| | |
|---|---|
| G06T 7/00 | (2017.01) |
| G06K 9/62 | (2006.01) |
| G06K 9/00 | (2006.01) |
| H04N 5/232 | (2006.01) |
| G06T 7/73 | (2017.01) |

(52) U.S. Cl.
CPC .......... *G06T 7/004* (2013.01); *G06K 9/00597* (2013.01); *G06K 9/6202* (2013.01); *G06T 7/73* (2017.01); *H04N 5/23219* (2013.01); *H04N 5/23229* (2013.01); *G06T 2207/10028* (2013.01); *G06T 2207/30201* (2013.01)

(58) Field of Classification Search
USPC ...................................... 396/77, 80
See application file for complete search history.

(56) References Cited

U.S. PATENT DOCUMENTS

| | | | |
|---|---|---|---|
| 2003/0164892 A1* | 9/2003 | Shiraishi ............ | H04N 5/23212 348/349 |
| 2008/0050108 A1* | 2/2008 | Mizutani ................. | G02B 7/36 396/104 |
| 2009/0225217 A1* | 9/2009 | Katsuda ................. | G02B 7/346 348/366 |
| 2011/0319131 A1* | 12/2011 | An ...................... | H04N 1/00307 455/556.1 |
| 2013/0162849 A1* | 6/2013 | Wu ........................ | H04N 5/225 348/208.4 |
| 2014/0375798 A1* | 12/2014 | Fujita ..................... | H04N 1/212 348/140 |

* cited by examiner

*Primary Examiner* — Clayton E LaBalle
*Assistant Examiner* — Linda B Smith
(74) *Attorney, Agent, or Firm* — Harness, Dickey & Pierce, P.L.C.

(57) ABSTRACT

A method for processing information and an electronic device are provided. The electronic device includes a camera device, an image is acquired by the camera device as a preview image, and a first distance between the camera device and a shooting object which is shot in the preview image is obtained; the preview image is detected, and at least one area meeting a predetermined condition is obtained, where the first distance corresponding to the at least one area falls within the first predetermined distance scope.

9 Claims, 3 Drawing Sheets

METHOD FOR PROCESSING INFORMATION AND ELECTRONIC DEVICE

CROSS REFERENCE TO RELATED APPLICATION

The present application claims the priority to Chinese Patent Application No. 201510145612.4, titled as "METHOD FOR PROCESSING INFORMATION AND ELECTRONIC DEVICE", filed on Mar. 30, 2015 with State Intellectual Property Office of PRC, which is incorporated herein by reference in its entirety.

TECHNICAL FIELD

The disclosure relates to the field of digital image processing technology, and in particular to a method for processing information and an electronic device.

BACKGROUND

Digital image processing technology is widely applied to various electronic devices nowadays, to realize face recognition, facial beautification, age judgment, facial expression detection, gender identification, man-machine interaction, driving assistance and/or medical assistance, etc., through taking images by the electronic devices. The applicant notices that, in the implementation of these applications, it is required to detect the face and identify the face area before the follow-up detection, in order to meet practical needs.

In conventional technologies, the taken image is generally traversed through a face detection window, to primarily identify the face area. However, in the process of traversing, for each movement of the face detection window, it is required to analyze the corresponding image and determine whether a predetermined condition is met, which takes a long time and cannot meet the requirement of fast face area acquisition for the user.

SUMMARY

In view of this, a method for processing information and an electronic device are provided.

To achieve the above objective, the following technical solution is provided.

A method for processing information is provided. The method is applied to an electronic device including a camera device. The method includes: obtaining a preview image of a shooting object via image acquisition performed on the shooting object by the camera device; obtaining a first distance between the camera device and the shooting object which is shot in the preview image; and obtaining, from the preview image, at least one area meeting a predetermined condition; where the first distance corresponding to the at least one area falls within the first predetermined distance scope.

Optionally, the process of obtaining the first distance between the shooting object and the camera device includes: during traversing the preview image through a detection window, obtaining the first distance between the camera device and the shooting object which is shot in a current preview image area corresponding to the detection window; where the size of the detection window varies with increased times for traversing the preview image.

Optionally, the process of obtaining the at least one area meeting the predetermined condition includes: during traversing the preview image through the detection window, comparing the first distance with a predetermined distance, where the predetermined distance depends on the size of the detection window; determining whether a first difference between the first distance and the predetermined distance is less than the first threshold; in case that the first difference is less than the first threshold, determining whether the area in the preview image corresponding to the first distance meets the predetermined condition; and in case that the first difference is not less than the first threshold, moving the detection window to a next location based on a preset step size, and returning to the step of obtaining the first distance between the camera device and the shooting object which is shot in the current preview image area corresponding to the detection window.

Optionally, the predetermined distance decreases with the increased size of the detection window.

Optionally, the method further includes: choosing two points in the area meeting the predetermined condition; and calculating a second distance between the chosen two points based on the first distance.

Optionally, the method further includes: comparing the second distance with a second predetermined distance scope; and determining whether the shooting object meets a preset requirement based on the comparison result.

Optionally, in a case that the camera device includes two cameras, the process of obtaining a first distance between the camera device and the shooting object includes:

obtaining the first distance between the camera device and the shooting object based on an imaging difference in the two cameras for the shooting object.

Optionally, in a case that the camera device includes one camera and one signal transceiver, the process of obtaining the first distance between the camera device and the shooting object includes:

transmitting, by the signal transceiver, a signal wave to the shooting object;

recording echo time when the signal transceiver receives the signal wave fed back by the shooting object for the first time; and calculating the first distance between the shooting object and the camera device based on the propagation velocity of the signal wave and the echo time.

Optionally, if the method for processing information is applied to human identification system, the process of choosing two points in the area meeting the predetermined condition includes:

determining locations of two eyes in the area meeting the predetermined condition through a preset eye locating algorithm.

Optionally, the method further includes:

outputting a first prompt message if it is determined that the shooting object does not meet the preset requirement.

An electronic device is provided, and the electronic device includes: a camera device, configured to perform image acquisition on a shooting object; and a processor, configured to obtain a preview image when the camera device performs the image acquisition, obtain, from the preview image, at least one area meeting a predetermined condition, based on a first distance between the shooting object and the camera device; where the first distance corresponding to the at least one area falls within a first predetermined distance scope.

Optionally, the camera device is configured to obtain depth information, and the depth information is used to determine the first distance between the shooting object and the camera device.

BRIEF DESCRIPTION OF THE DRAWINGS

To illustrate the technical solutions according to the embodiments of the invention or in the conventional technology more clearly, the drawings to be used in the description of the embodiments or the conventional technology are described briefly hereinafter. Apparently, the drawings in the following description are only a part of rather than all of the embodiments of the invention, and other drawings may be obtained by those skilled in the art according to those drawings without creative effort.

DETAILED DESCRIPTION OF THE EMBODIMENTS

Hereinafter, the technical solutions according to the embodiments of the invention are described clearly and completely in conjunction with the drawings according to the embodiments of the invention. Apparently, the described embodiments are only a part of rather than all of the embodiments of the invention. All the other embodiments obtained by those skilled in the art based on the embodiments of the invention without creative effort fall within the protection scope of the disclosure.

A method for processing information and an electronic device are provided in the disclosure. The electronic device includes a camera device, an image of a shooting object is acquired by the camera device to be a preview image, a first distance between the shooting object and the camera device is obtained. The preview image is detected for obtaining at least one area meeting a predetermined condition, where the first distance corresponding to the at least one area falls within a first predetermined distance scope; thus it is only needed to determine whether the area corresponding to the first distance within the first distance scope meets the predetermined condition, efficiency for detecting the preview image area meeting the predetermined condition is improved, and user requirements for detection speed is satisfied.

To make the above objectives, features and merits of the disclosure more understandable, the disclosure is illustrated in conjunction with drawings and embodiments.

Figure 1:
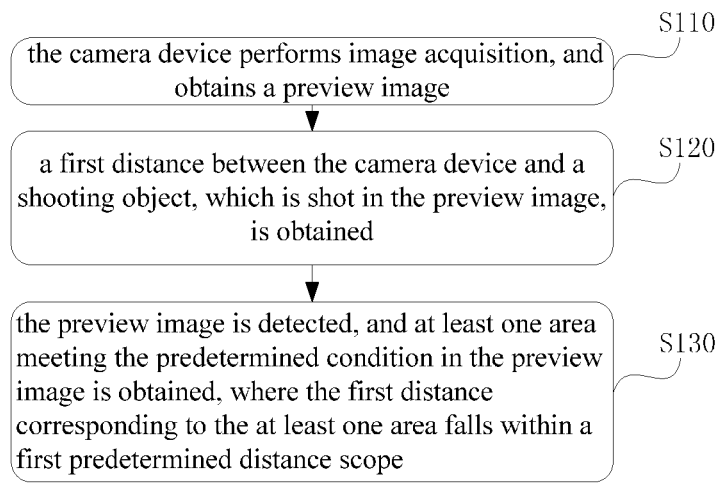
FIG. 1 is a flowchart of a method for processing information according to an embodiment of the disclosure.

Referring to FIG. 1, a flowchart of a method for processing information according to an embodiment of the disclosure is shown. The method may be applied to an electronic device which may include a camera device. In practice, the electronic device may be a cell phone, notebook, tablet computer or security identification device with the camera device, etc., and the disclosure is not limited herein. In view of this, the method for processing information according to the embodiment may include steps S110-S130.

In step S110, the camera device performs image acquisition and obtains a preview image.

In step S120, a first distance between the camera device and a shooting object, which is shot in the preview image, is obtained.

In practice, when it is needed to detect a specific area (denoted as a target area) in the preview image of the shooting object, generally the preview image is traversed with a detection algorithm after obtaining the preview image of the shooting object, thus all the target areas approved by the detection algorithm is preliminarily obtained.

However, the applicant notes that, during the above traverse detection, for every movement of the detection window, it is needed to detect with the detection algorithm whether there is an area meeting a predetermined condition in the preview image in a detection window at a current location, in order to obtain all the areas meeting the predetermined condition in the entire preview image of the shooting object. It may be seen that, this approach greatly reduces the detection speed, and cannot meet the speed requirement for locating the target area for the user.

In view of this, the applicant finds that, pixel number of the shot preview image is associated with the pixel number of the camera device and the distance between the camera device and the shooting object. In other words, under the condition of camera device with a fixed pixel number, different information integrities are obtained in a case that the distances between the shooting object corresponding to the detection window and the camera device are different during traversing the preview image through the detection window with a predetermined size, thus the amount of information for some locations traversed by the detection window is not suitable for template matching (not suitable for a conventional integral-graph-cascade-algorithm), and there is no target area in these locations inevitably.

It may be learned from the above analysis that, during traversing the preview image through the detection window with the predetermined size, the obtained amount of information may be adequate for accomplishing this round of template matching only in a case that the distance between the part of the shooting object, which is shot in the current preview image area corresponding to the detection window, and the camera device falls within a specific scope. Thus the applicant determines through experiments predetermined distances, i.e., optimal distances, from shooting objects corresponding to detection windows with different sizes to the camera device. In other words, during traversing the preview image, once the size of the detection window is determined, only information obtained from the preview image area corresponding to the area of the shooting object which is within the specific distance scope (which is determined based on a predetermined distance corresponding to the size of the detection window and a first threshold around the predetermined distance) from the camera device may be adequate for accomplishing the round of template matching.

In conclusion, in practicing the embodiment, the step S120 may include obtaining a first distance between the shooting object, which is shot in the current preview image area corresponding to the detection window, and the camera device during traversing the preview image with the detection window. The size of the detection window may vary with increased times for traversing the preview image.

Optionally, in a case that the camera device of the electronic device includes two cameras, the first distance between the shooting object and the camera device may be obtained based on an imaging difference in the two cameras for the shooting object, which is shot in a preview area. For specific procedure of the calculation, conventional calculation based on dual-camera distance detection may be referred to, which is not described herein.

Figure 2:
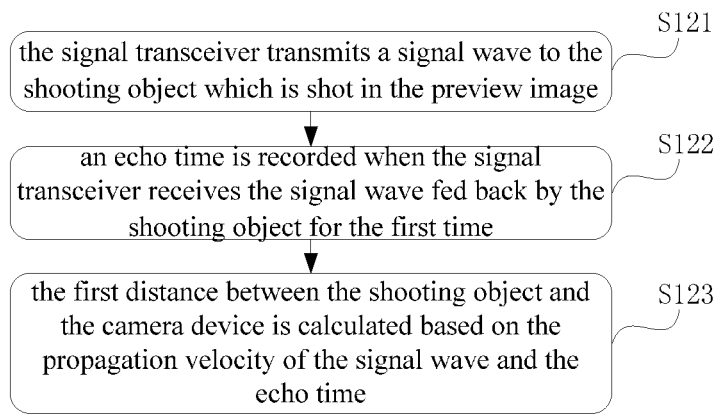
FIG. 2 is a partial flowchart of a method for processing information according to an embodiment of the disclosure.

The disclosure is not limited to the above method for calculating the first distance, and an electronic device with single camera may be alternatively used. It should be noted that, in this case, the camera device of the electronic device further includes a signal transceiver besides the camera, such as an infrared transceiver, a radar transceiver, a laser transceiver or the like, which is not limited herein. FIG. 2 is a partial flowchart of a method for processing information according to an embodiment of the disclosure. The method for obtaining the first distance based on this architecture may include steps S121-S123.

In step S121, the signal transceiver transmits a signal wave to the shooting object which is shot in the preview image.

During traversing the preview image through a detection window with a predetermined size, for each movement to a location, the signal transceiver is controlled to transmit the signal wave to a part of the shooting object, which is shot in the preview image area at the current location.

In step S122, an echo time is recorded when the signal transceiver receives the signal wave fed back by the shooting object for the first time.

The echo time corresponding to the shooting object is a duration started from transmitting the signal wave to the shooting object by the signal transceiver and stopped at receiving the signal wave fed back by the shooting object for the first time.

In step S123, the first distance between the shooting object and the camera device is calculated based on the propagation velocity of the signal wave and the echo time.

The propagation velocities of signal waves with different wavelengths in the air are known, thus after the echo time of the signal wave with the wavelength is obtained, the first distance between the shooting object and the camera device is calculated based on a formula: distance=velocity*time.

It should be noted that, the disclosure is not limited to the above two methods for calculating the first distance between the shooting object and the camera device, and any calculating methods occurring to those skilled in the art without creative effort fall within the protection scope of the disclosure, which is not described herein.

In addition, it should be noted that, for the process of obtaining the first distance in the above step S120, in practice, after the preview image is obtained, it is feasible to obtain respective first distances from respective parts of the shooting object to the camera device with corresponding calculation modes based on the structure of the camera device, in order to directly acquire the first distance in subsequent steps when the first distance between a specific part of the shooting object and the camera device is needed. In other words, the first distance between the shooting object and the camera device may be obtained before traversing the preview image, or may be alternatively obtained during traversing the preview image by the detection window, which is not limited herein. The latter is taken as an example to describe the technical solution in the method for processing information.

In step S130, the preview image is detected, and at least one area in the preview image meeting the predetermined condition is obtained.

The first distance corresponding to the at least one area falls within a first predetermined distance scope, and the first predetermined distance scope is determined based on the size of current detection window traversing the preview image and a first threshold allowed to be deviated.

In practice, during traversing the preview image with the detection window, the first distance between the camera device and the part of the shooting object, which is shot in current preview image area corresponding to the detection window, may be compared with the predetermined distance, where the predetermined distance depends on the size of the detection window, and it is determined whether a first difference between the first distance and the predetermined distance is less than the first threshold. Only in the case that the first difference is less than the first threshold, it is determined whether the area in the preview image corresponding to the first distance meets a predetermined condition through the conventional algorithm, of which the specific procedure is known in the field and is not described herein; in case that the first difference is not less than the first threshold, the detection for the preview image at current location and the determination whether the preview image meets the predetermined condition are skipped at the moment, and the detection window is moved to a next location based on a preset step size, then, the first distance between the shooting object corresponding to the next location and the camera device is calculation in the above described manner, and subsequently it is determined whether the first difference between the first distance and the predetermined distance is less than the first threshold. It may be seen that, for some areas of which the difference between the first distance and the predetermined distance is no less than the first threshold, no subsequent detection and determination are performed according to the embodiment, the detection time for detecting in the preview image the areas meeting the predetermined condition is significantly saved, and detection efficiency is improved.

Optionally, based on the above embodiments, for some applications, e.g., the case that shooting object includes a face and the eyes are to be located, after at least one area meeting the predetermined condition in the preview area is obtained, two points may be chosen in the area meeting the predetermined condition, and a second distance between the two points is calculated based on the corresponding first distance. Then, the second distance is compared with a second predetermined distance scope, in order to determine whether the shooting object meets a preset requirement based on the determination result, and thus to satisfy the user needs.

Taking eye locating application as an example, the result of the step S130 is actually a preliminary face area in the preview image. After that, locations of the two eyes may be obtained in the face area through conventional eye locating algorithm, and a spatial distance between the two eyes, i.e., a pupil distance, is calculated based on the first location corresponding to the face area. There is a fixed range for the pupil distance of human, such as 62 mm±5 mm, thus, in practice, it may be determined whether the shooting object corresponding to the face area is a human face through determining whether the calculated pupil distance falls within the range, in order to avoid deception by images including faces, thus accuracy of face detection is improved.

Optionally, if it is determined that the shooting object does not meet the preset requirement, a first prompt message may be output, such as voice prompt message or beep, to notify the user owning the electronic device that the shooting object is not a human, which is very practical.

Figure 3:
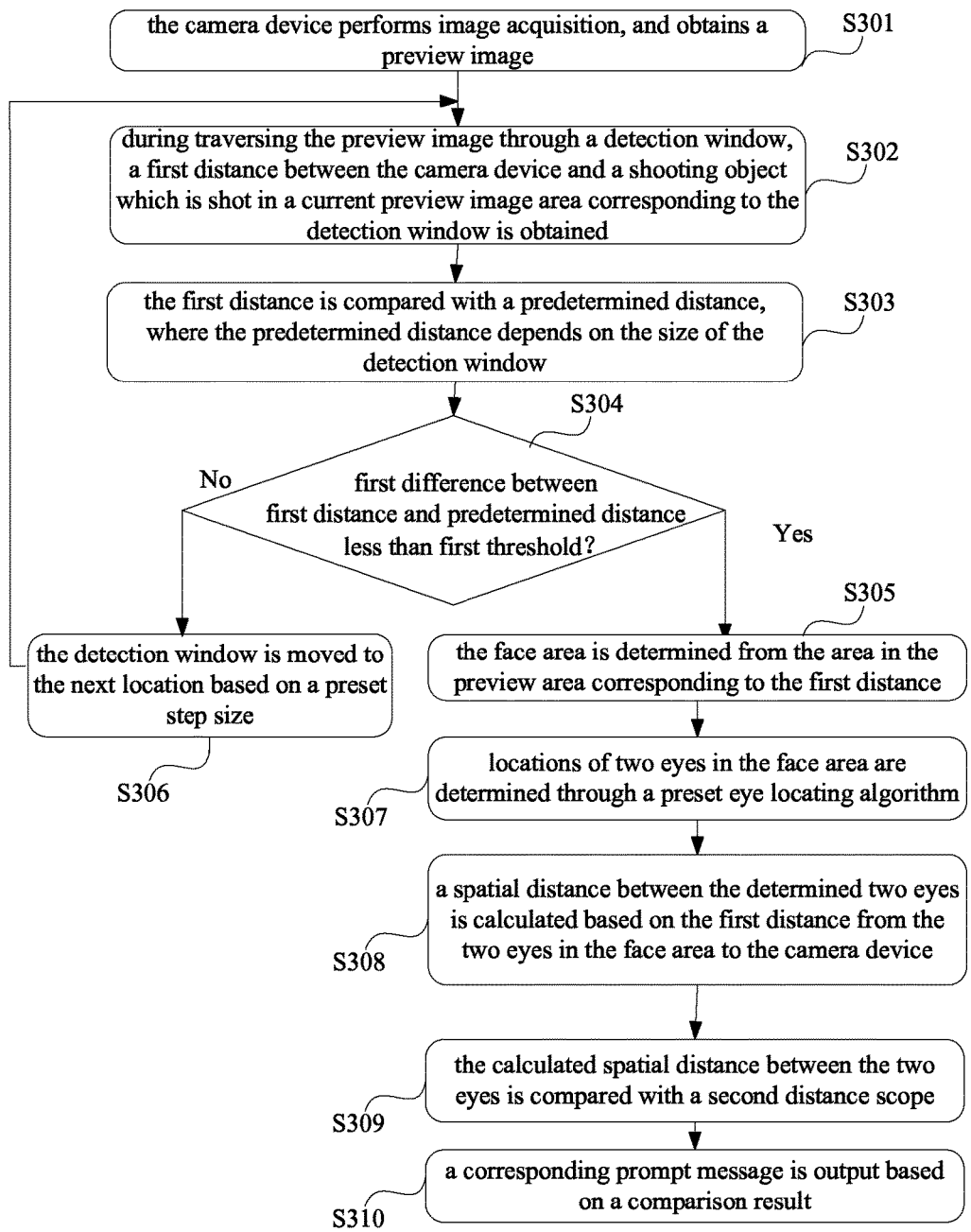
FIG. 3 is a flowchart of a method for processing information according to another embodiment of the disclosure.

To illustrate the technical solution in the disclosure more clearly, a scenario of eye locating application is taken as example. FIG. 3 is a flowchart of a method for processing information according to another embodiment of the disclosure. The method may be applied to an electronic device, where the electronic device includes a camera device. The method for processing information according to the embodiment of the disclosure may include steps S301-S310.

In step S301, the camera device performs image acquisition and obtains a preview image.

The camera device includes at least one camera, and in a case that the camera device includes one camera, a signal transceiver may be further included.

In step S302, during traversing the preview image through a detection window, a first distance between the camera device and a shooting object which is shot in a current preview image area corresponding to the detection window is obtained.

A size of a face area is usually a 20*20 dot array, in an approach of increasing the size of the detection window with increased times for traverse, the size of the detection window during the first round of traversing may be set as the 20*20 dot array, and if the preview image is an image with 640*480 pixels, the detection window is moved for (640-21)*(480-21)=284121 times in the first round of traverse, then the size of the detection window is increased to a 21*21 dot array (the detection window may be increased based on other step sizes, which is not limited herein), the traverse is performed for another round, and so on, until the whole face area in the preview image are determined.

For the above step S302 according to the embodiment, in each time traversing the preview image, to improve a face detection speed, the first distance between the camera device and the shooting object which is shot in the corresponding preview image area is calculated for each movement of the detection window. A specific method of calculating the first distance is relevant to the specific structure of the camera device, and for details, the corresponding description of above embodiments may be referred to, which is not described herein.

In step S303, the first distance is compared with a predetermined distance, where the predetermined distance depends on the size of the detection window.

It may be learned from the above analysis that, for the face with a specific pixel number, complete image information may be obtained only in a case that the distance between the face and the camera device falls within a specific scope, thus, if the preview image is traversed through the detection window with a predetermined size, only the information obtained from the preview image of the shooting object with a specific distance scope from the camera device is suitable for subsequent template matching, where the scope is determined based on an optimal distance between the camera device and the shooting object corresponding to the detection window with the predetermined size as well as the allowed deviation, i.e., a first threshold.

It is learned from research that, in a case that a viewing angle of the camera device is 90 degree and a human is S cm away from the camera device, the image width=2S=640 pixels, the pixels corresponding to the 12 cm face=302*12/S. After experiments, the distances between the face and the camera device needed for obtaining complete face image information in case of different pixel numbers for the face is obtained, i.e., a correspondence between some pixel numbers of the face and the distances S from the face to the camera device is obtained, as shown in Table 1.

TABLE 1

| Correspondence between distances and pixel numbers of face | | | | | | | | | | | | |
|---|---|---|---|---|---|---|---|---|---|---|---|---|
| | S (cm) | | | | | | | | | | | |
| | 10 | 20 | 30 | 40 | 50 | 60 | 70 | 80 | 90 | 100 | 110 | 120 |
| pixel number of face | 384 | 192 | 128 | 96 | 77 | 64 | 55 | 48 | 43 | 38 | 35 | 32 |
| | S (cm) | | | | | | | | | | | |
| | 130 | 140 | 150 | 160 | 170 | 180 | 190 | 200 | 210 | 220 | 230 | |
| pixel number of face | 30 | 27 | 26 | 24 | 23 | 21 | 20 | 19 | 18 | 17 | 16 | |

It may be learned from the above analysis that, during traversing the preview image through the detection window, the sizes of the detection window may be set as the pixel numbers of face in the above Table 1. Thus, based on the above predetermined correspondence, the optimum distances between the shooting object and the camera device, which correspond to detection windows with different sizes and are adequate to obtain complete image information of the shooting object, may be obtained. In other words, during traversing the preview image, once the size of the detection window is determined, the predetermined distance corresponding to the detection window with the size, i.e., the optimal distance for obtaining complete information of the shooting object image, is determined based on the above correspondence. Then, after the first distance between the camera device and the shooting object which is shot in a preview image area at the current location of the detection window is obtained, for improving the face detection speed, the first distance may be compared with the predetermined distance which is determined in the above mentioned manner, in order to determine if there is complete information in the preview image at the current location.

It may be learned based on the correspondence between the predetermined distance and the size of the detection window shown in Table 1 that, the predetermined distance decreases when the size of the detection window increases.

In step S304, it is determined whether a first difference between the first distance and the predetermined distance is less than a first threshold, and in case that the first difference is less than the first threshold, the process proceeds to step S305; in case that the first difference is not less than the first threshold, the process proceeds to step S306.

The first threshold is a maximum value by which the distance between the camera device and the shooting object is allowed to deviate from the optimal distance in practical application, which may be determined through multiple experiments, or may be set based on experience of those skilled in the art. The value is not limited herein.

In step S305, the face area is determined from the area in the preview area corresponding to the first distance.

In practice, the conventional face detection algorithm may be used to determine whether there is a face area in the preview area, of which the specific procedure is known in the field and is not described herein.

The above Table 1 is taken as an example again. If the detection window in the first round of traverse is a 20*20 dot array, it may be learned based on the correspondence between the sizes of the detection window and the optimal distances for obtaining the complete image information of the shooting object from the Table 1 that, image information of the human about 190 cm away from the camera device (the distance with allowed deviation, i.e., deviated from the distance of 190 cm with the first threshold) is suitable for template matching. The information of human too far away is not enough, while the information of human too close is not suitable for this round of matching. If the detection window in the second round of traverse is a 22*22 dot array, template matching is performed only on the image information of the human with the distance greater than 170 cm and less than 180 cm away from the camera device, and it is not needed to perform template matching on shooting objects with other distances. By the analogy, the preview image is traversed quickly and efficiently through detection windows with different sizes, and the face area in the shooting object is determined.

In step S306, the detection window is moved to the next location based on a preset step size, and the process proceeds to step S320.

The preset step size is the number of pixels crossed by each movement of the detection window, and the direction of movement may be set in advance. If the traverse is started from a top right corner, the detection window is moved left and down, or in other directions, which is not limited herein.

It should be noted that, during a same round of preview image traverse through the detection window, the size of the detection window is fixed.

In step S307, locations of two eyes in the face area are determined through a preset eye locating algorithm.

According to the embodiment, eye locating algorithm is a conventional, which is not described herein. For the process of locating eyes in the face area in step S307, the conventional eye locating method or eye detection method may be referred to, which is not described in the disclosure.

In step S308, a spatial distance between the determined two eyes is calculated based on the first distance from the two eyes in the face area to the camera device.

The spatial distance between the two eyes is a pupil distance.

According to the embodiment, in a case that the camera device includes two cameras, the spatial coordinates of the two eyes in the face area may be calculated through conventional dual-camera based distance detection and locating algorithm, thus the pupil distance of the face is obtained. Similarly, in a case that the camera device includes one camera and one signal transceiver, the spatial coordinates of the two eyes may be calculated based on parameters such as the obtained first distance from the two eyes to the camera, along with the viewing angle of the camera, thus the pupil distance of the face is obtained. The disclosure is not limited to the two manners, other manners determined by those skilled in the art without creative effort fall within the protection scope of the disclosure.

In step S309, the calculated spatial distance between the two eyes is compared with a second distance scope.

The second distance scope is the scope of usual pupil distance of the human, which may be 62 mm±5 mm but is not limited hereto.

In step S310, a corresponding prompt message is output based on a comparison result.

If the comparison result is that the calculated pupil distance of the shooting object falls within the second distance scope, it may be determined that the shooting object includes the human, and a first prompt message may be output; otherwise, it may be determined that there is no human in the shooting object, the shooting object may be a photo, and a second prompt message different from the first prompt message may be output, thus the user may determine whether there is a human in the shooting object based on the output prompt message, which is convenient and practical.

In conclusion, according to the embodiments, during traversing the preview image obtained through the camera device, after determining the preview image area detected through the detection window with predetermined size, the first distance between the camera device and the shooting object which is shot in the preview image area is obtained, and in a case that the first difference between the first distance and the preset distance is less than the first threshold, it is detected whether there is a face area in the preview image area through conventional face detection algorithm; otherwise, the system moves the detection window to the next location directly rather than executing the face detection algorithm, re-computes the first distance between the camera device and the shooting object which is shot in the preview image area at the next location, and so on. Compared with conventional technology in which the face detection algorithm is executed for each movement of the detection window, detection efficiency is significantly improved; further, after determining the face area, the locations of two eyes included in the face area are determined through eye locating algorithm according to the embodiment, then the pupil distance is calculated based on the corresponding first distance, and the shooting object is differentiated as a human instead of a photo including the human based on the determination of whether the pupil distance falls within the scope of human pupil distance, which improves the practicability of the method for processing information.

Figure 4:
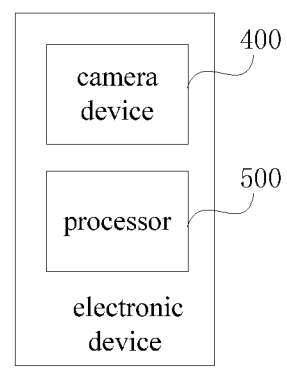
FIG. 4 is a structure diagram of an electronic device according to an embodiment of the disclosure.

FIG. 4 is a structure diagram of an electronic device according to an embodiment of the disclosure. In practice, the electronic device may be a cell phone, camera, tablet computer, security identification device, etc., which is not limited herein. The electronic device according to the embodiment may include a camera device and a processor.

The camera device 400 is configured to perform image acquisition on a shooting object.

Optionally, in practice, the camera device 400 may include two cameras, and a first distance between the shooting object and the camera device is obtained through a dual-camera distance detection and locating principle in conventional technology. Specifically, in a case that the camera device 400 includes two cameras, the first distance between the shooting object and the camera device is calculated based on an imaging difference of the shooting object in the two cameras.

The camera device 400 may include one camera and one signal transceiver, and the signal transceiver may be an infrared transceiver, radar transceiver, laser transceiver, etc., which is not limited herein. In practice, referring to corresponding description in the above method embodiment, the process for the camera device in this structure to calculate the first distance between the shooting object and the camera device may be obtained, which is not described again here.

It may be learned from the above analysis that, the camera device 400 according to the embodiment may be further configured to obtain depth information, where the depth information is used to determine the first distance between the shooting object and the camera device, i.e., corresponding depth information is obtain based on specific structure of the camera device 400, in order to calculate and output the first distance between the shooting object and the camera device accordingly. It may be seen that, if the camera device 400 has different structures, the obtained depth information is different, which is not limited herein.

The processor 500 is configured to obtain a preview image when the camera device 400 performs image acquisition, detect the preview image and obtain at least one area in the preview image meeting a predetermined condition based on the first distance between the shooting object and the camera device;

where the first distance corresponding to the at least one area falls within a first predetermined distance scope.

Optionally, in practice, processes performed on the preview image by the processor 500 may include: during traversing the preview image through the detection window, comparing the first distance between the camera device and the shooting object which is shot in the current preview image area corresponding to the detection window, and in a case that the first difference between the first distance and the predetermined distance is less than the first threshold, determining, through the preset detection algorithm, whether the area in the preview image corresponding to the first distance meets the predetermined condition; in a case that the first difference is not less than the first threshold, moving the detection window to the next location based on the preset step size, re-obtaining the first distance corresponding to the next location, and proceeding with the above steps.

The predetermined distance depends on the size of the detection window, and the size of the detection window varies with increased times for traversing the preview image.

In practice, e.g., in the face detection application, the processor 500 may determine, through the conventional face detection algorithm, whether the area in the preview image corresponding to the first distance meets the predetermined condition, i.e., the processor 500 determines whether there is a face area in the preview image. It may be seen that, the determination in connection with the above predetermined condition is a conventional technology, which is not described herein.

It may be learned from the above analysis that, according to the embodiment, when the processor traverses the preview image through the detection window with predetermined size, the preview image area, for which the shot object is away from the camera device by a first distance greater than the predetermined distance, is skipped without determining whether the predetermined condition is met, thus detection time is significantly shortened, and detection efficiency is improved.

Optionally, to improve detection accuracy, based on the above embodiments, the processor 500 may choose two points in the area meeting the predetermined condition, and calculate a second distance between the chosen two points based on the corresponding first distance. Then, the second distance is compared with a second predetermined distance scope, and it is determined whether the shooting object meets the preset requirement based on the comparison result.

Specifically, the eye locating application is taken as an example for illustration. After the face area is obtained, locations of the two eyes in the determined face area may be calculated through conventional eye locating algorithm, and spatial coordinates of the two eyes are calculated based on the corresponding first distance, thus the pupil distance is obtained. Since the human pupil distance is usually in a specific scope, i.e., the second distance scope, it is determined whether the calculated pupil distance falls within the second distance scope, so as to determine whether the shooting object includes a human or the shooting object is an image of the human, thus the image detection accuracy is improved.

It should be noted that, both the eye locating algorithm and the face detection algorithm in the embodiments are conventional technologies, which are not described herein.

Optionally, based on the above embodiments, the processor 500 may be further configured to output a first prompt message if it is determined that the shooting object does not meet the preset requirement, and output a second prompt message different from the first prompt message if the area in the preview image corresponding to the first distance does not meet the predetermined condition.

An additional prompting device may be alternatively provided on the electronic device to output the first prompt message if it is determined that the shooting object does not meet the preset requirement, and output the second prompt message different from the first prompt message if the area in the preview image corresponding to the first distance does not meet the predetermined condition. The prompting device may be a buzzer, indicator light, voice module, etc., which is not limited herein.

In conclusion, according to the embodiment, the processor obtains the preview image when the camera device performs image acquisition, then during traversing the preview image through the detection window with predetermined size, the processor obtains the first distance between the camera device and the shooting object which is shot in the preview image, and accordingly skips the preview image area for which the shot object is away from the camera device by a first distance greater than the predetermined distance, thus the objective of improving the detection efficiency is achieved; further, the processor determines the second distance between the chosen two points in the determined area meeting the predetermined condition, and the accuracy of detecting the shooting object is improved, thus the practicability of electronic device is enhanced.

It should be noted that, in practice, besides the above described devices, the electronic device provided in the disclosure may include energy storage device, connection element, display, etc., which are not described one by one here. Any other device determined by those skilled in the art without creative effort falls within the protection scope of the disclosure.

The embodiments of the disclosure are described in a progressive manner, each embodiment focuses on a difference from other embodiments, and for a same or similar part, the embodiments may refer to each other. For the electronic device according to the embodiments, it corresponds to the method according to the embodiments, thus description is brief, and for relevance, the method part may be referred to.

Those skilled in the art may further realize that, the units and algorithm steps in the examples according to the embodiments of the disclosure, may be implemented through electronic hardware, computer software or combination of the electronic hardware and computer software. To illustrate interchangeability of the hardware and software clearly, constitution and steps of the examples are generally described based on the function in the above description. Whether these functions are executed through hardware or software exactly, depends on a specific application and a design constraint of the technical solution. Those skilled in the art may use different methods to implement the described function for each specific application, and the implementation should not be considered to exceed the scope of the disclosure.

The method and algorithm steps according to the embodiments of the disclosure, may be implemented through hardware, software module executed by a processor, or combination of the hardware and the software module executed by the processor. The software module may be placed in random access memory (RAM), memory, read-only memory (ROM), electrically programmable ROM, electrically erasable programmable ROM, register, hard disk, removable disk, CD-ROM, or any other forms of storage medium known in the technology field.

The above description of the embodiments of the disclosure is to enable those skilled in the art to implement or use the disclosure. Various modifications made to the embodiments are apparent to those skilled in the art, and the general principles defined in the disclosure may be implemented in other embodiments without departing from the spirit and scope of the disclosure. Hence, the disclosure is not limited to the embodiments described in the disclosure, but conforms to a widest scope consistent with the principles and novel features in the disclosure.

What is claimed is:

1. A method for processing information, applied to an electronic device, the method comprises:
   obtaining a preview image of a shooting object via image acquisition performed on the shooting object by a camera device;
   obtaining a first distance between the camera device and the shooting object, which is shot in the preview image in response to:
      during traversing the preview image through a detection window, obtaining the first distance between the camera device and the shooting object which is shot in a current preview image area corresponding to the detection window,
      wherein a size of the detection window varies with increased times for traversing the preview image; and
   obtaining, from the preview image, at least one area meeting a predetermined condition in response to:
      during traversing the preview image through the detection window, comparing the first distance with a predetermined distance, wherein the predetermined distance depends on the size of the detection window;
      determining whether a first difference between the first distance and the predetermined distance is less than a first threshold;
      in case that the first difference is less than the first threshold, determining whether the area in the preview image corresponding to the first distance meets the predetermined condition; and
      in case that the first difference is not less than the first threshold, moving the detection window to a next location based on a preset step size, and returning to the process of obtaining the first distance between the camera device and the shooting object which is shot in the current preview image area corresponding to the detection window;
   wherein the first distance corresponding to the at least one area falls within a first predetermined distance scope.

2. The method according to claim 1, wherein the predetermined distance decreases with the increased size of the detection window.

3. The method according to claim 1, further comprising:
   choosing two points in the area meeting the predetermined condition; and
   calculating a second distance between the two points based on the first distance.

4. The method according to claim 1, wherein in a case that the camera device includes two cameras, the process of obtaining the first distance between the camera device and the shooting object comprises:
   obtaining the first distance between the camera device and the shooting object based on an imaging difference in the two cameras for the shooting object.

5. The method according to claim 1, wherein in a case that the camera device includes one camera and one signal transceiver, the process of obtaining the first distance between the camera device and the shooting object comprises:
   transmitting, by the signal transceiver, a signal wave to the shooting object;
   recording echo time when the signal transceiver receives the signal wave fed back by the shooting object for the first time; and
   calculating the first distance between the shooting object and the camera device based on a propagation velocity of the signal wave and the echo time.

6. The method according to claim 3, further comprising:
   comparing the second distance with a second predetermined distance scope; and
   determining whether the shooting object meets a preset requirement based on the comparison result.

7. The method according to claim 6, wherein if the method for processing information is applied to human identification system, the process of choosing two points in the area meeting the predetermined condition comprises:
   determining locations of two eyes in the area meeting the predetermined condition through a preset eye locating algorithm.

8. The method according to claim 7, further comprising:
   outputting a first prompt message if it is determined that the shooting object does not meet the preset requirement.

9. An electronic device, comprising:
   a camera device, configured to perform image acquisition on a shooting object, and obtain depth information, wherein the depth information is used to determine a first distance between the camera device and the shooting object; and
   a processor, configured to:
      obtain a preview image when the camera device performs the image acquisition,
      obtain the first distance between the camera device and the shooting object, which is shot in the preview image, wherein to obtain the first distance, the processor is configured to:
         during traversing the preview image through a detection window, obtain the first distance between the camera device and the shooting object which is shot in a current preview image area corresponding to the detection window, wherein a size of the detection window varies with increased times for traversing the preview image; and
      obtain, from the preview image, at least one area meeting a predetermined condition, wherein to obtain the at least one area meeting a predetermined condition, the processor is configured to:
         during traversing the preview image through the detection window, compare the first distance with a predetermined distance, wherein the predetermined distance depends on the size of the detection window;

determine whether a first difference between the first distance and the predetermined distance is less than a first threshold;

in response to the first difference being less than the first threshold, determine that the area in the preview image corresponding to the first distance meets the predetermined condition; and in response to the first distance not being less than the first threshold, move the detection window to a next location based on a preset step size, and return to the process of obtaining the first distance between the camera device and the shooting object which is shot in the current preview image area corresponding to the detection window, wherein the first distance corresponding to the at least one area falls within a first predetermined distance scope.

* * * * *